US012138637B2

(12) United States Patent
Levine

(10) Patent No.: US 12,138,637 B2
(45) Date of Patent: Nov. 12, 2024

(54) PORTABLE IONIZATION UNIT FOR ATTACHMENT TO AN OVERHEAD AIRFLOW NOZZLE

(71) Applicant: Clean Air Group, Inc., Fairfield, CT (US)

(72) Inventor: Steve Levine, Westport, CT (US)

(73) Assignee: Clean Air Group, Inc., Fairfield, CT (US)

( * ) Notice: Subject to any disclaimer, the term of this patent is extended or adjusted under 35 U.S.C. 154(b) by 361 days.

(21) Appl. No.: 17/399,585

(22) Filed: Aug. 11, 2021

(65) Prior Publication Data

US 2022/0048046 A1 Feb. 17, 2022

Related U.S. Application Data

(60) Provisional application No. 63/064,458, filed on Aug. 12, 2020.

(51) Int. Cl.

| | |
|---|---|
| ***B03C 3/32*** | (2006.01) |
| ***B03C 3/06*** | (2006.01) |
| ***B03C 3/41*** | (2006.01) |
| ***B03C 3/66*** | (2006.01) |
| ***B03C 3/82*** | (2006.01) |

(52) U.S. Cl.

CPC .................. *B03C 3/32* (2013.01); *B03C 3/06* (2013.01); *B03C 3/41* (2013.01); *B03C 3/66* (2013.01); *B03C 3/82* (2013.01); *B03C 2201/06* (2013.01); *B03C 2201/30* (2013.01)

(58) Field of Classification Search

CPC .... B03C 3/32; B03C 3/06; B03C 3/41; B03C 3/66; B03C 3/82; B03C 2201/06; B03C 2201/30

See application file for complete search history.

(56) References Cited

U.S. PATENT DOCUMENTS

| | | | | |
|---|---|---|---|---|
| 6,610,116 B1 * | 8/2003 | Avery | B01D 46/10 | 55/504 |
| 7,122,066 B2 * | 10/2006 | Avery | B01D 46/10 | 55/504 |
| 2007/0006478 A1 * | 1/2007 | Kotsuji | H01T 19/00 | 34/96 |
| 2007/0266855 A1 * | 11/2007 | Fleisher | B03C 3/68 | 96/77 |
| 2009/0151567 A1 * | 6/2009 | Krigmont | B03C 3/09 | 96/66 |
| 2009/0151568 A1 * | 6/2009 | Krigmont | B03C 3/025 | 96/60 |
| 2011/0181996 A1 * | 7/2011 | Caffarella | H01T 23/00 | 361/231 |

* cited by examiner

*Primary Examiner* — Christopher P Jones
*Assistant Examiner* — Sonji Turner
(74) *Attorney, Agent, or Firm* — Amster, Rothstein & Ebenstein LLP

(57) ABSTRACT

A portable ionization unit for attachment to an overhead airflow nozzle is disclosed. The ionization unit includes a housing. A rechargeable self-contained ionizer is positioned inside the housing. The housing is attachable to the overhead airflow nozzle. Once the ionization unit is attached to the overhead airflow nozzle, a dome of bipolar ionized air is created above the seated passenger.

12 Claims, 6 Drawing Sheets

PORTABLE IONIZATION UNIT FOR ATTACHMENT TO AN OVERHEAD AIRFLOW NOZZLE

FIELD OF THE INVENTION

The present invention relates to a portable ionization unit for attachment to an overhead airflow nozzle.

BACKGROUND OF THE INVENTION

It is believed that there are no commercially available portable systems that address air quality problems unique to the passenger cabins of aircraft, trains, buses, and the like, particularly with regard to gaseous pollutants which are often encountered. The present invention provides a solution to the above problems.

SUMMARY OF THE INVENTION

The invention is directed to a portable ionization unit for attachment to an overhead airflow nozzle. The ionization unit is described with respect to an aircraft cabin overhead airflow nozzle, but has application to other overhead airflow or other oriented airflow nozzles such as those found, for example, on trains or buses. The ionization unit includes a housing. A rechargeable self-contained ionizer is positioned inside the housing. The housing is attachable (preferably removably) to the overhead airflow nozzle. Once the ionization unit is attached to the overhead airflow nozzle, a dome of bipolar ionized air is created above the seated passenger.

BRIEF DESCRIPTION OF THE DRAWINGS

The teachings of the present invention will be readily understood from the following detailed description when considered in conjunction with the accompanying drawings, in which.

Figure 1:
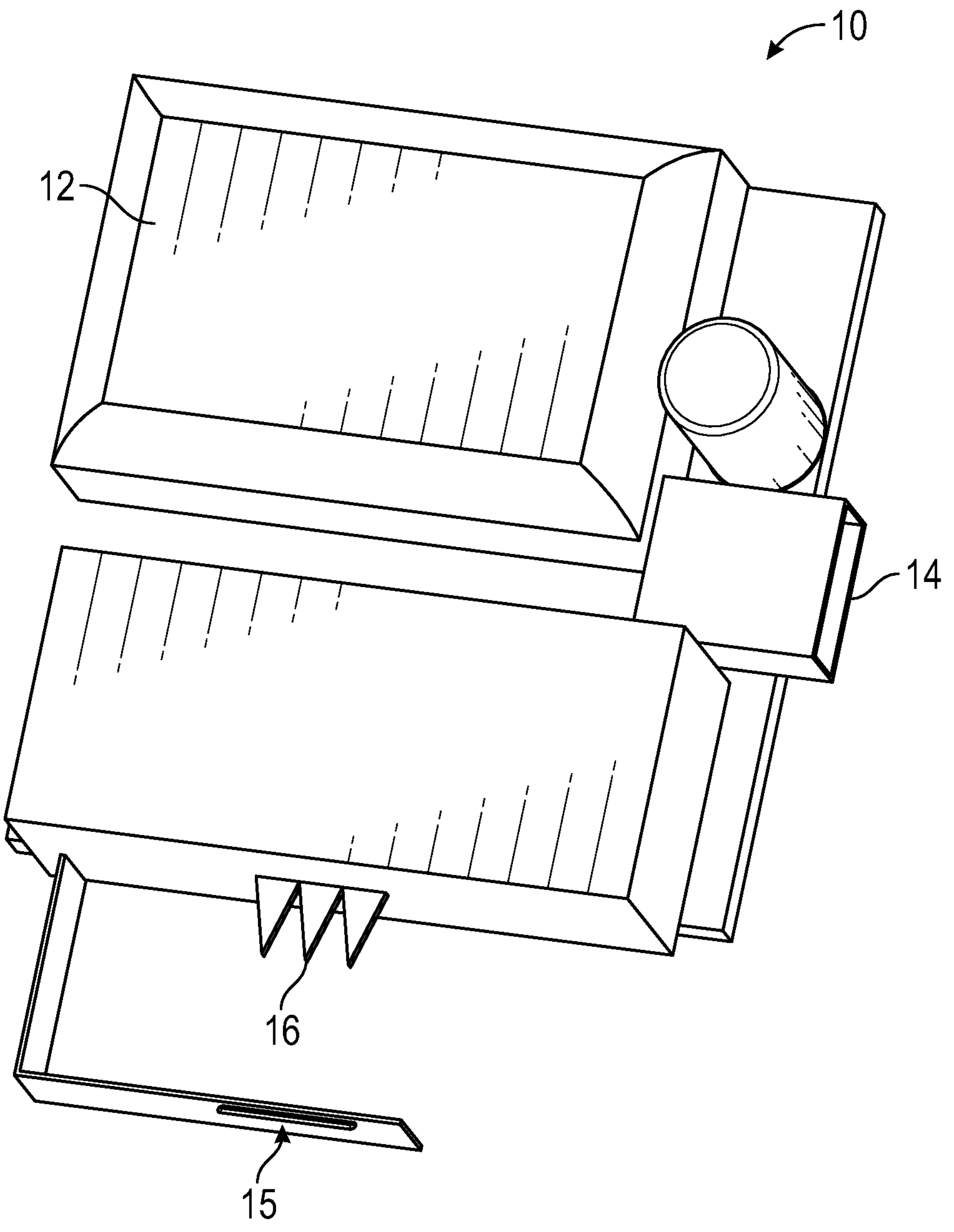
FIG. 1 is a top perspective view of a rechargeable self-contained ionizer in accordance with the present invention.

To facilitate an understanding of the invention, identical reference numerals have been used, when appropriate, to designate the same or similar elements that are common to the figures. Further, unless stated otherwise, the features shown in the figures are not drawn to scale, but are shown for illustrative purposes only.

DETAILED DESCRIPTION OF THE INVENTION

The present invention will be described in detail with reference to FIGS. 1-6.

As shown in the top perspective view of FIG. 1, an ionizer 10 includes a flat-pack battery 12 which is electrically connected to a universal serial bus (USB) charging port 14. An electric USB cable (not shown) can be removably connected to a power source for recharging the flat-pack battery 12. The ionizer 10 further includes a power switch 15 to control the operation of the unit. The ionizer 10 includes a bipolar emitter 16 and associated circuitry. In a preferred embodiment, the bipolar emitter 16 is a needlepoint emitter with three point sawtooth scorotron emitter, although other bipolar ionization emission devices can be employed.

Figure 2:
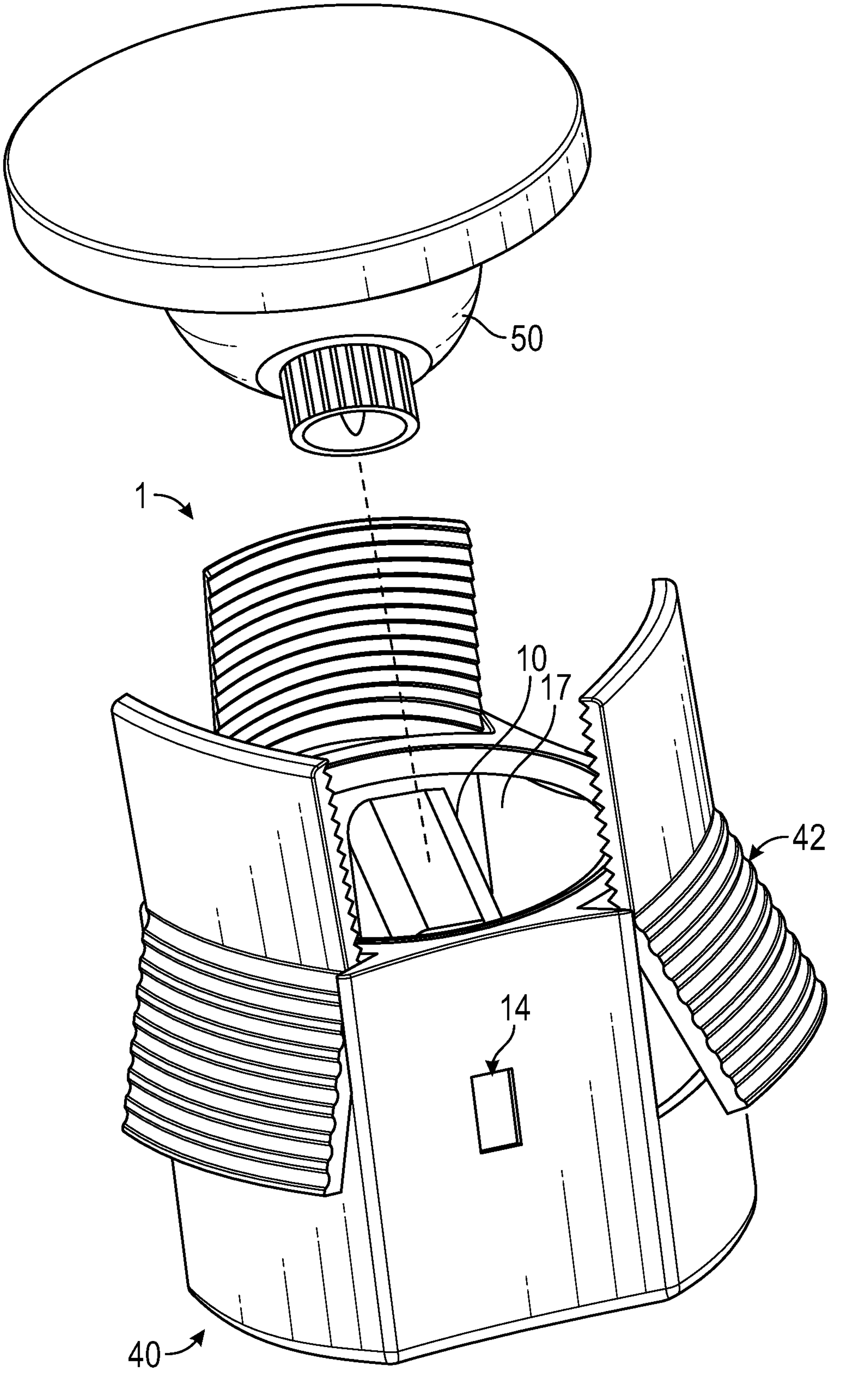
FIG. 2 is a perspective side view of a housing containing the ionizer.

FIG. 2 is a perspective side view of an assembled portable ionization unit 1. The portable ionization unit 1 comprises a cylindrical-shaped housing 40 containing the ionizer 10 of FIG. 1. In one embodiment, the ionizer 10 is positioned vertically inside the housing 40 and is oriented so that the USB charging port 14 is accessible at a side wall of the housing 40. The housing 40 is attachable to an overhead airflow nozzle 50 via a plurality of spring-loaded grabbers 42 extending longitudinally from the housing 40. In a preferred embodiment, the spring-loaded grabbers 42 have jagged grabbing surfaces 43. A person of ordinary skill in the art will appreciate that the number of spring-loaded grabbers 42 is not considered limiting and can include one, two, three, four, five or more grabbers. Preferably, the grabbers 42 are hinged and biased to apply a grabbing force towards the center of the housing 40 via springs 44. As illustratively shown in FIGS. 3-6, each of the plurality of spring-loaded grabbers 42 includes a spring 44 which biases a forward portion 47 of the spring-loaded grabber in the direction towards the central axis of the tubular housing 40, and an opposing aft portion 49 configured to selectively move (pivot) the forward portion 47 towards and away from the central axis of the tubular housing 40 so as to respectively engage and disengage the portable ionization unit 1 with the overhead airflow nozzle 50. In other embodiments, the housing 40 includes other means for attachment to the overhead airflow nozzle including, but not limited to, magnets, adhesive tape, suction cups, and the like.

Figure 4:
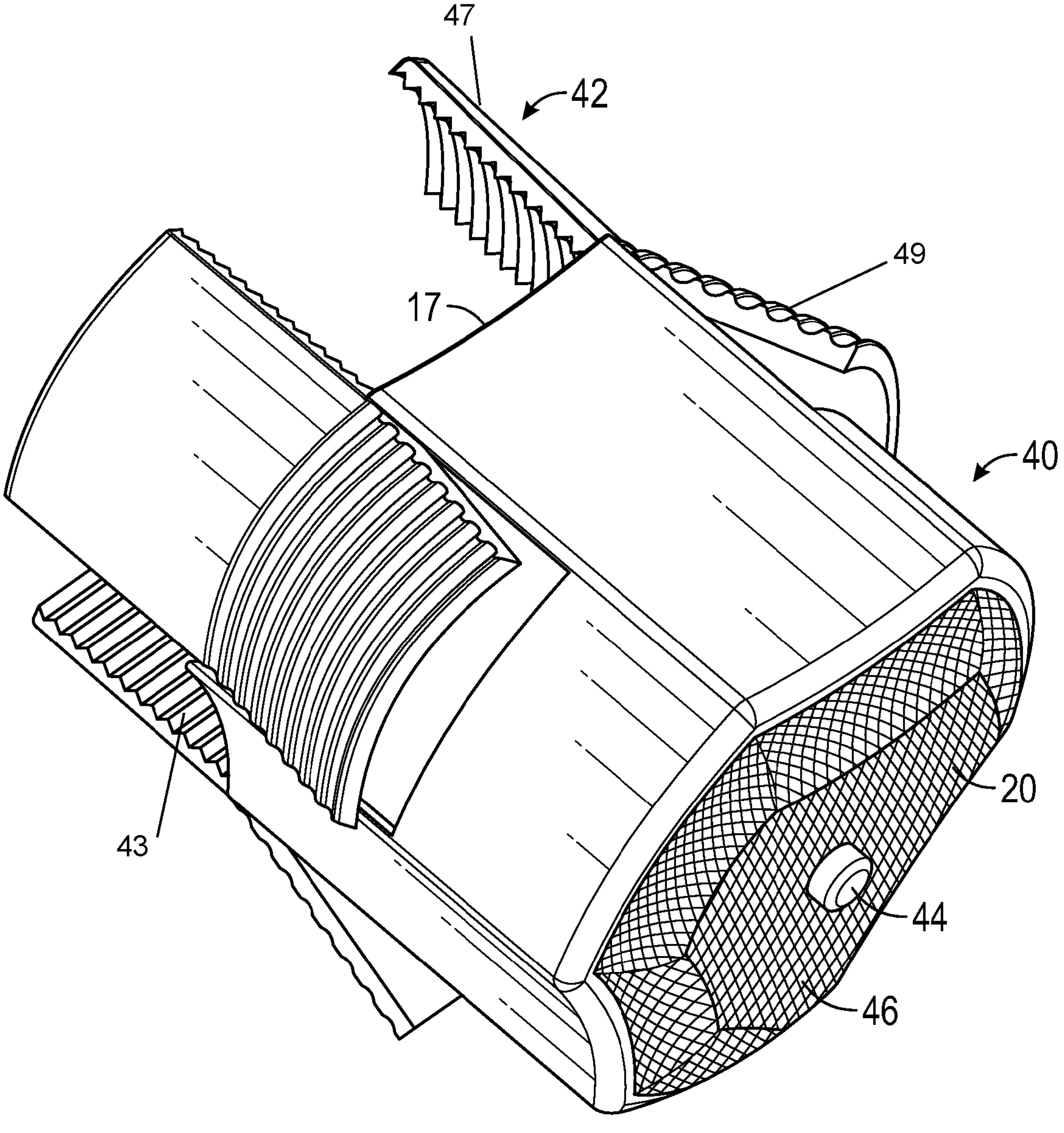
FIG. 4 is a bottom perspective view of the housing.

The housing 40 includes an air inlet 17 and an air outlet 20, shown in FIG. 4. When the ionization unit is attached to the overhead airflow nozzle 50, air exiting the airflow nozzle 50 enters into the housing 40 through the air inlet 17, and exits the housing 40 from the air outlet 20.

When the ionizer 10 is installed and turned on, the air passing through the portable ionization unit 1 creates a dome of bipolar ionized air above the seated passenger. It should be understood that the overhead airflow nozzle found in commercial aircraft cabins is typically a universal part with known dimensions. For example, the overhead airflow nozzle is generally the same across aircraft manufacturers, including but not limited to, AIRBUS, BOEING, EMBRAER, CANADAIR, etc. The overhead airflow nozzle creates the source of air movement of the purified air, wherein the speed of airflow is preferably controllable by the user by rotating the airflow nozzle in a given direction. In one embodiment, the housing 40 is manufactured from thermoplastic elastomers (TPE), a type of plastic, which is soft, semi-crushable for safety, yet rigid enough house the ionizer 10.

Figure 3:
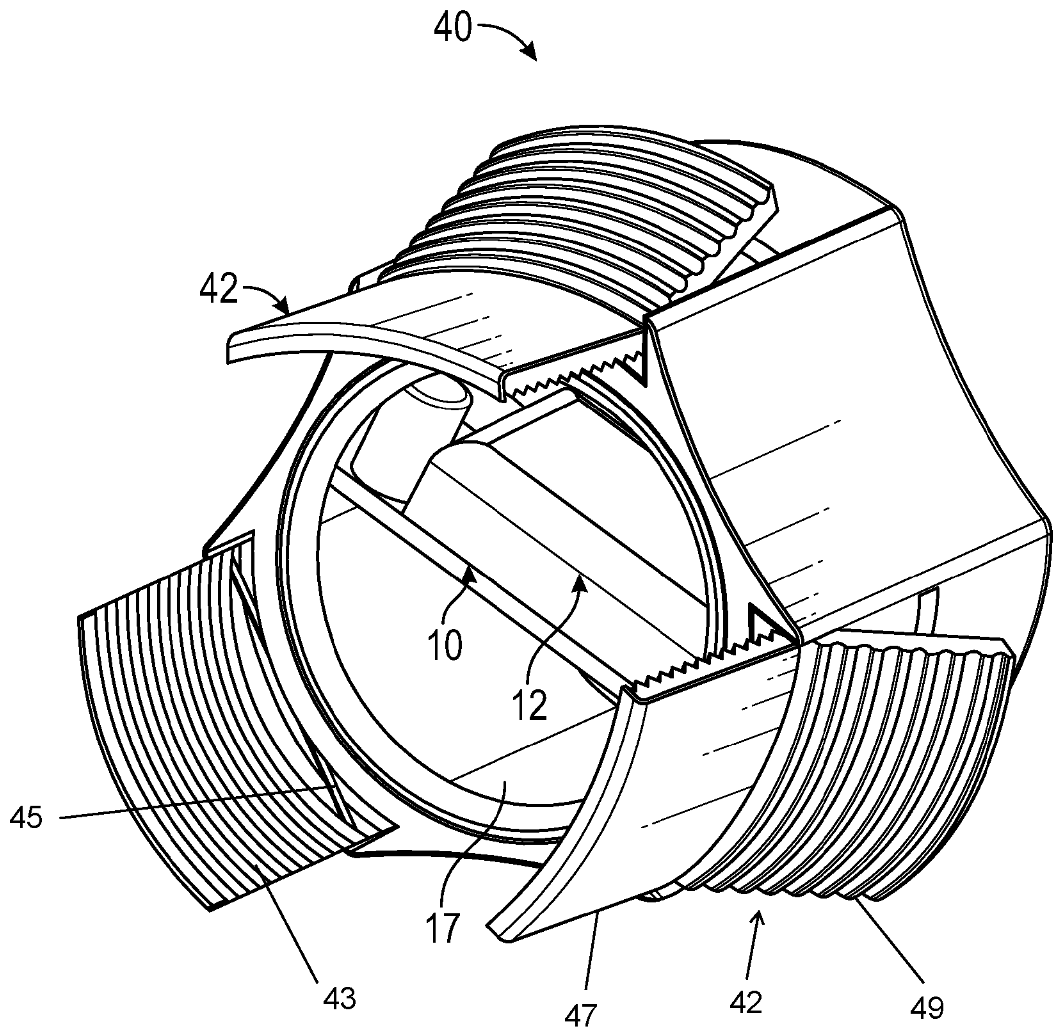
FIG. 3 is a top perspective view of the housing.

FIG. 3 is a top perspective view of the housing showing further details of the ionizer.

FIG. 4 is a bottom perspective view of the housing 40. A combination power button and LED light 44 protrudes from the bottom surface for controlling and displaying the operation of the unit after the user presses the button. Preferably, the LED light 44 is programmed to provide useful information to the user concerning the operation of the unit. For example, in one embodiment the LED light 44 can indicate when the battery power has been depleted to a predetermined level. A perforated metal grille 46 surrounds the LED light 44 and allows the conditioned air to flow freely therethrough.

Figure 5:
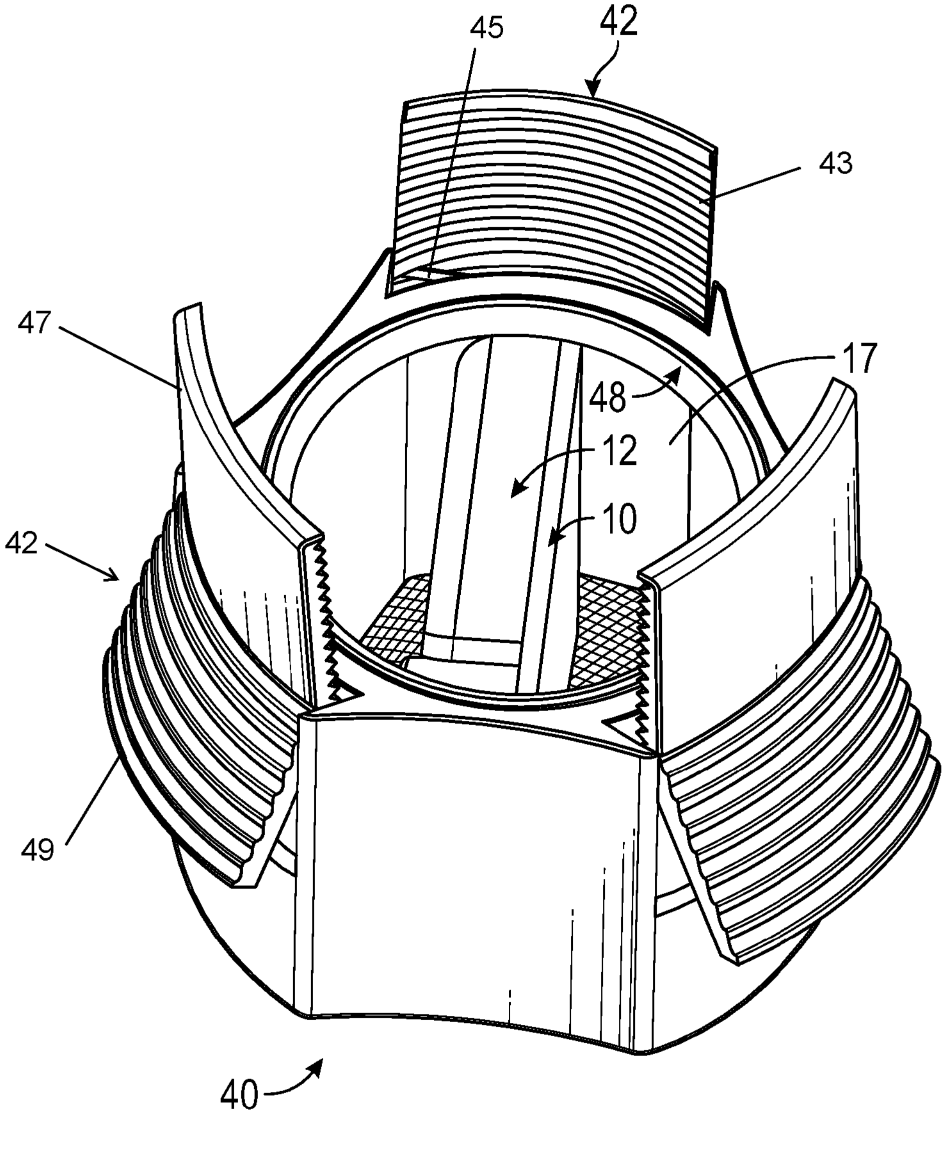
FIG. 5 is a top perspective view of the housing.

FIG. 5 is a top perspective view of the housing 40. A flexible rubber seal 48 is positioned along the inner rim of the housing 40 to provide an airtight seal when the housing 40 is attached to an overhead airflow nozzle.

Figure 6:
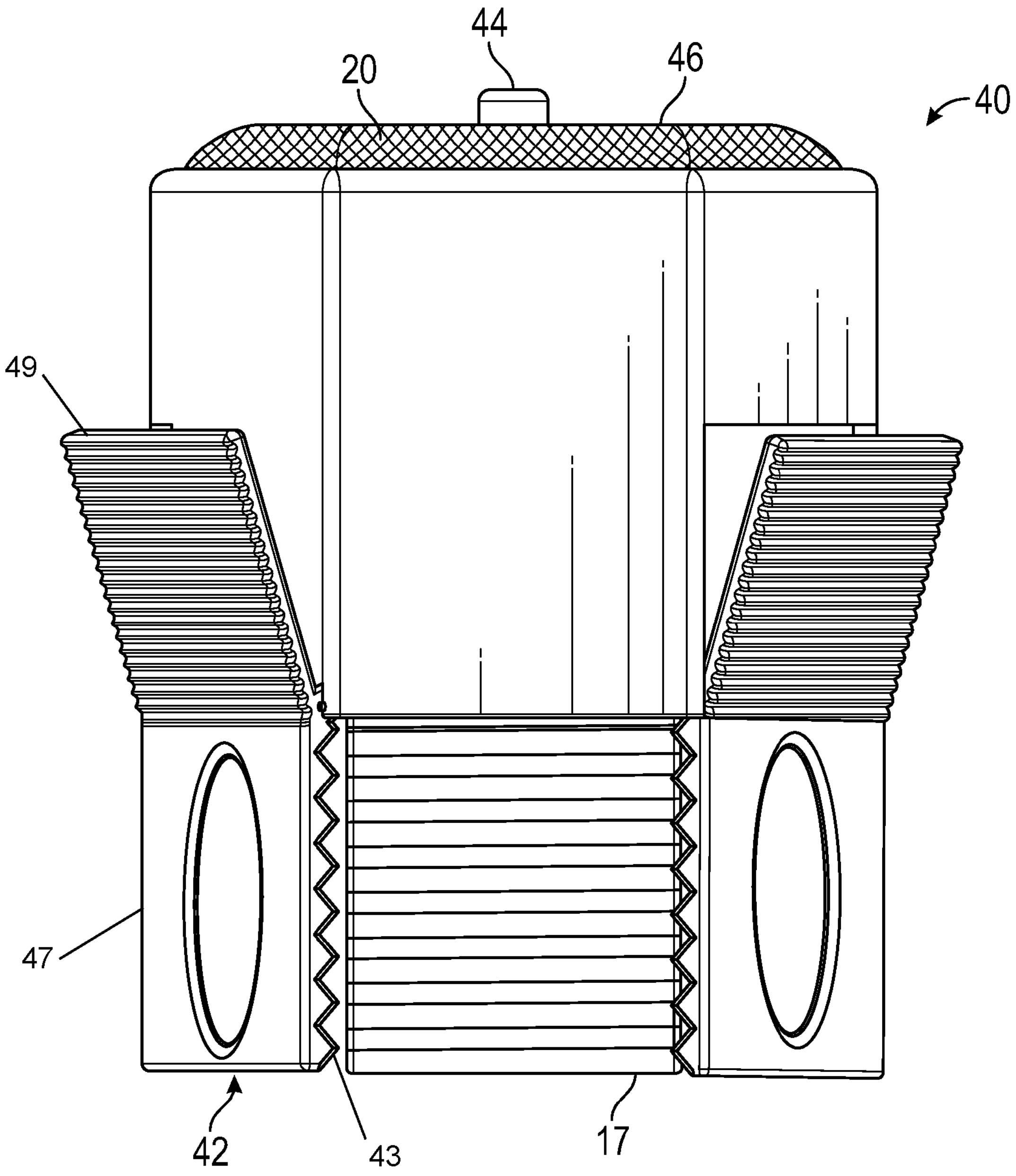
FIG. 6 is a side view of the housing.

FIG. 6 is a side view of the housing 40, showing jagged grabbing surfaces.

A method for the practice of the invention will now be described. After the user boards the aircraft and takes his seat, the ionization unit is attached to an overhead airflow nozzle. The ionizer can be powered on during the duration of the flight to create a dome of bipolar ionized air above the seated passenger. If the battery requires recharging, a USB cord can be connected from an external power supply to the unit.

Although an exemplary description of the invention has been set forth above to enable those of ordinary skill in the art to make and use the invention, that description should not be construed to limit the invention, and various modifications and variations can be made to the description without departing from the scope of the invention, as will be understood by those with ordinary skill in the art, and the scope thereof is determined by the claims that follow.

The invention claimed is:

1. A portable ionization unit for attachment to an overhead airflow nozzle, the portable ionization unit comprising:

- a tubular housing with an attachment device configured to be user-attachable and detachable from the overhead airflow nozzle, wherein the tubular housing includes an air inlet at a first end configured to receive air from the overhead airflow nozzle, and an axially aligned air outlet at an opposing second end via which the air exits the tubular housing, the attachment device including at least one spring-loaded grabber which is rotatably hinged proximately to the first end of the tubular housing and configured to apply a grabbing force to the overhead airflow nozzle in a direction towards a central axis of the tubular housing; and
- an ionizer mounted within the tubular housing, the ionizer comprising:
  - a bipolar ionization emitter and associated circuitry,
  - a rechargeable battery to provide power for the bipolar ionization emitter and associated circuitry,
  - a power switch for turning the ionizer on and off,
  - a USB charging port with a receptacle for charging the rechargeable battery, wherein the USB charging port is mounted so that the receptacle is user-accessible from outside the tubular housing; and

- an LED light that is illuminated when the ionizer is turned on;
- wherein the ionizer is configured to ionize the air which passes through the tubular housing via the air inlet and the air outlet.

2. The portable ionization unit of claim 1, wherein the at least one spring-loaded grabber includes a spring for biasing a forward portion of the at least one spring-loaded grabber in the direction towards the central axis of the tubular housing, and an opposing aft portion configured to selectively move the forward portion towards and away from the central axis of the tubular housing so as to respectively engage and disengage the portable ionization unit with the overhead airflow nozzle.

3. The portable ionization unit of claim 1, wherein the bipolar ionization emitter is a needlepoint emitter.

4. The portable ionization unit of claim 3, wherein the needlepoint emitter is a three-point sawtooth scorotron emitter.

5. The portable ionization unit of claim 1, wherein the tubular housing is made of thermoplastic elastomer.

6. The portable ionization unit of claim 1, wherein the air outlet is covered by a perforated grille.

7. The portable ionization unit of claim 6, wherein the LED light is mounted at a center of the perforated grille.

8. The portable ionization unit of claim 1, further comprising a flexible rubber seal positioned along an inner rim of the tubular housing adjacent to the air inlet, to provide an airtight seal when the tubular housing is attached to the overhead airflow nozzle.

9. The portable ionization unit of claim 2, wherein the forward portion of the at least one spring-loaded grabber includes jagged grabbing surfaces for interfacing with the overhead airflow nozzle.

10. The portable ionization unit of claim 1, wherein the at least one spring-loaded grabber includes a magnet for attachment to the overhead airflow nozzle.

11. The portable ionization unit of claim 1, wherein the at least one spring-loaded grabber includes a suction cup for attachment to the overhead airflow nozzle.

12. The portable ionization unit of claim 6, wherein the at least one spring-loaded grabber includes an adhesive fastener arranged for attachment to the overhead airflow nozzle.

* * * * *